UNITED STATES PATENT OFFICE.

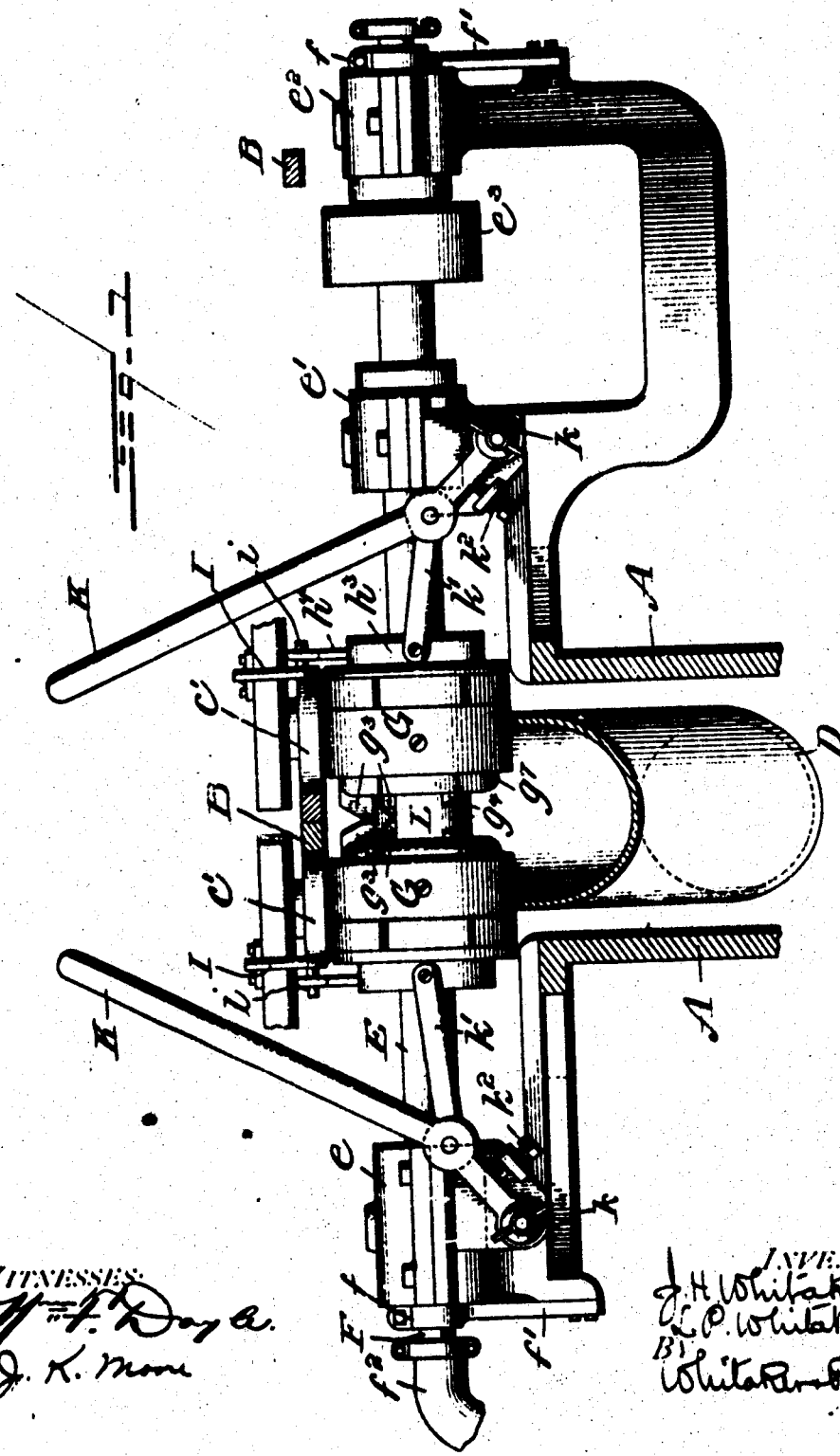

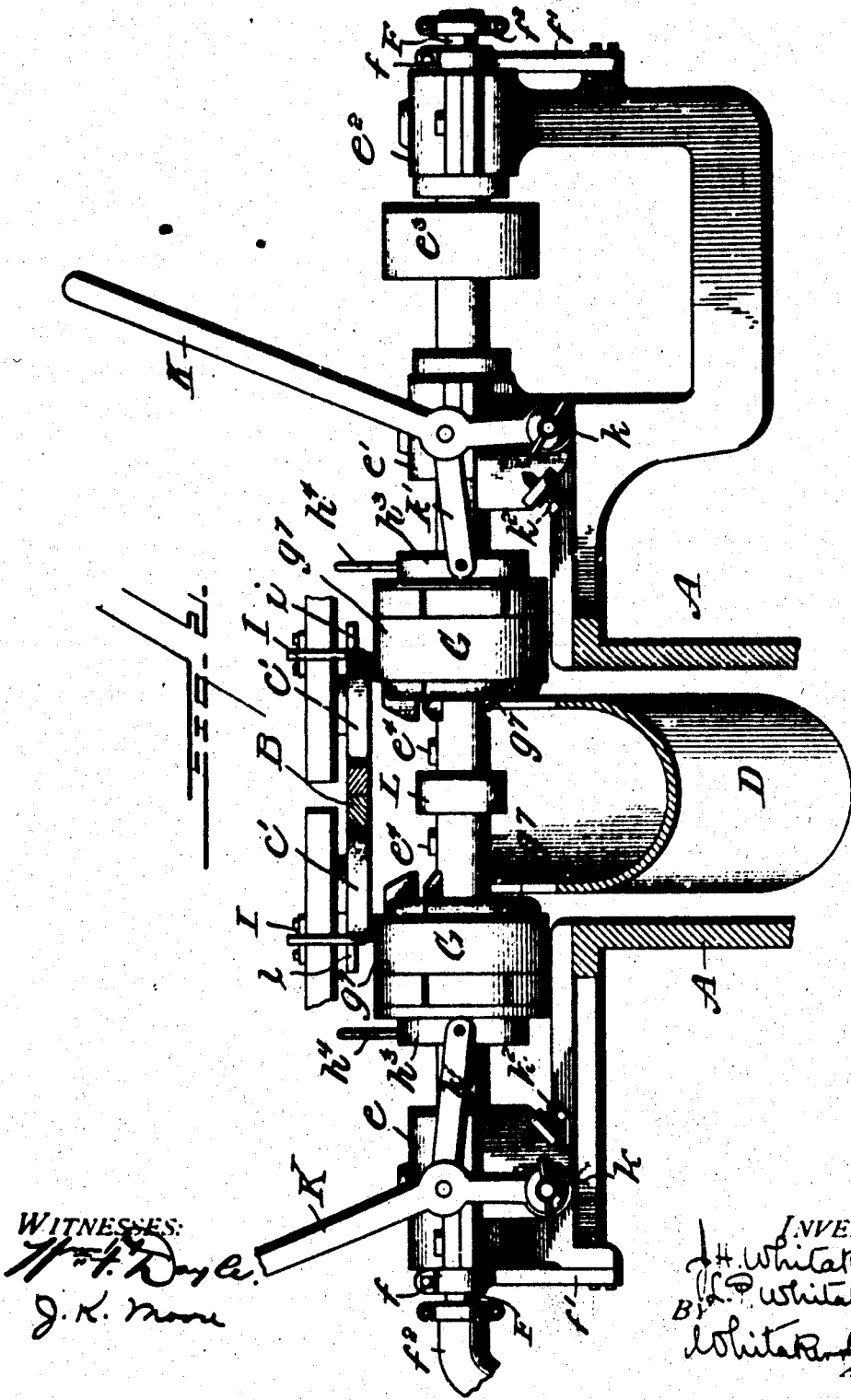

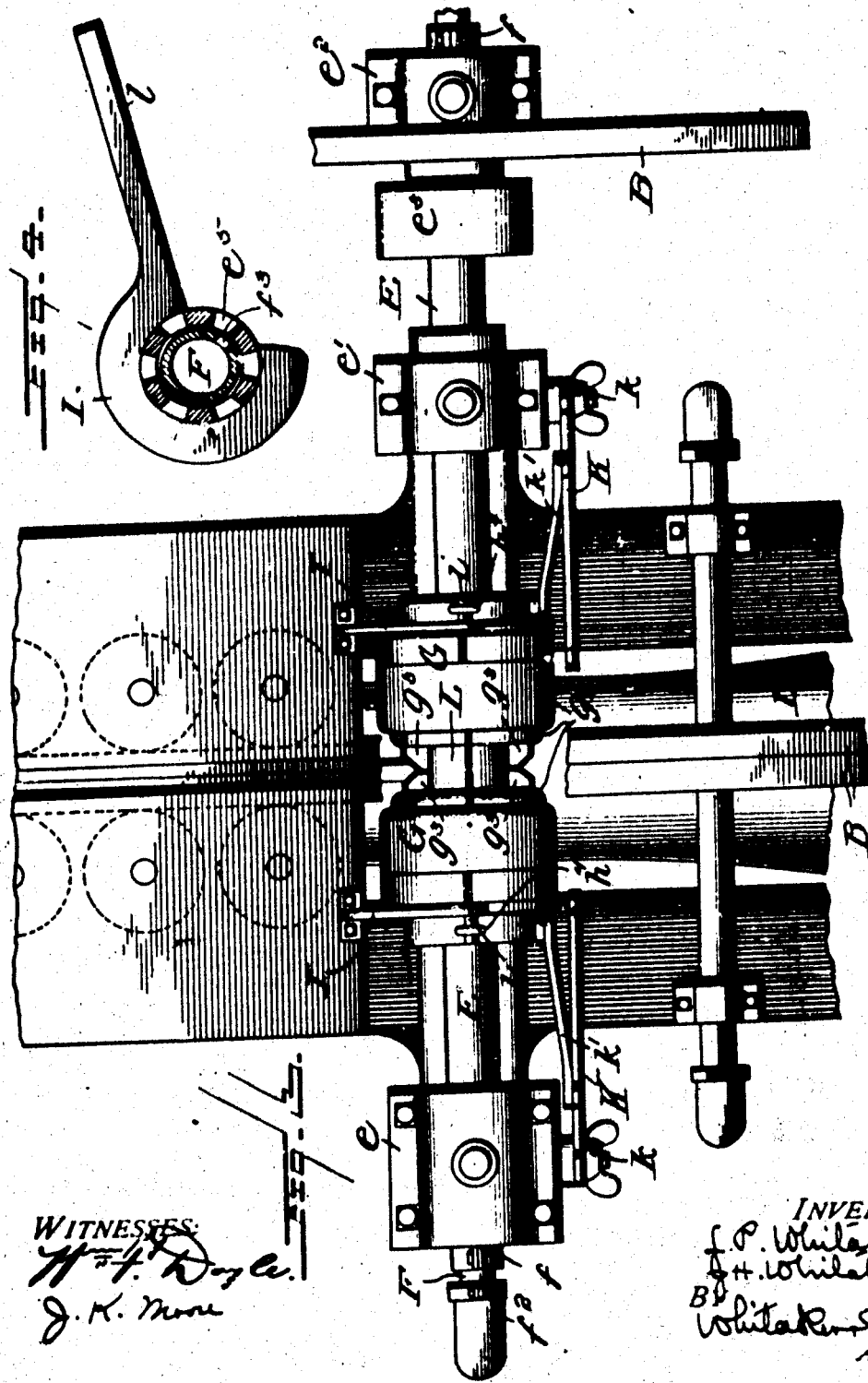

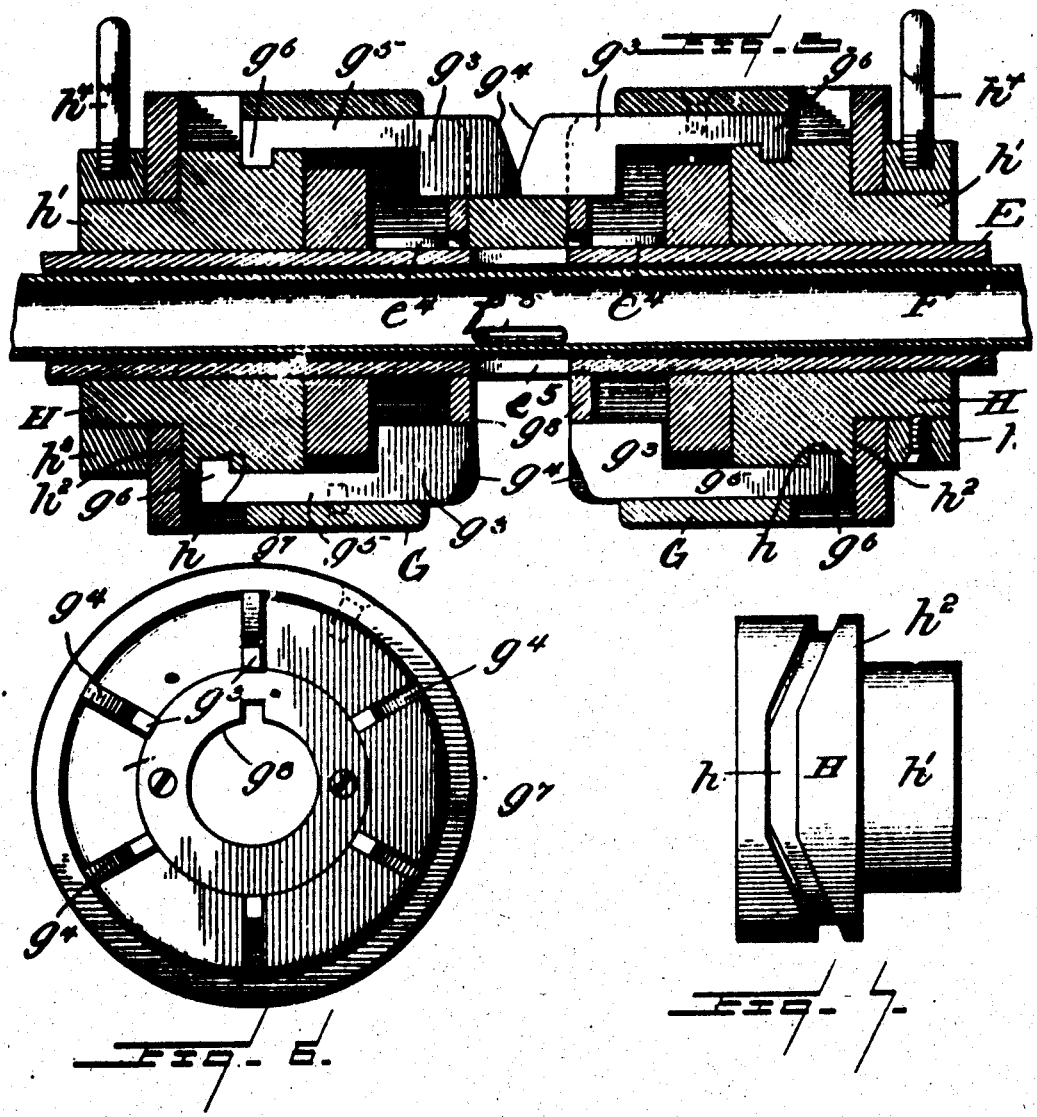

JESSE H. WHITAKER AND LOUIS P. WHITAKER, OF WASHINGTON, DISTRICT OF COLUMBIA, ASSIGNORS TO THE PNEUMATIC TOBACCO STEMMER COMPANY, OF WASHINGTON, DISTRICT OF COLUMBIA.

TOBACCO-STEMMING MACHINE.

No. 841,754.

Specification of Letters Patent.

Patented Jan. 22, 1907.

Application filed April 16, 1903. Serial No. 152,939.

*To all whom it may concern:*

Be it known that we, JESSE H. WHITAKER and LOUIS P. WHITAKER, citizens of the United States, residing at Washington, in the District of Columbia, have invented certain new and useful Improvements in Tobacco-Stemming Machines; and we do hereby declare the following to be a full, clear, and exact description of the invention, such as will enable others skilled in the art to which it appertains to make and use the same.

This invention relates to the class of tobacco-stemming machines described and illustrated in the application of L. P. Whitaker filed May 9, 1902, and given Serial No. 106,508, and patented October 20, 1903, Patent No. 741,863, upon which this invention is an improvement.

The present invention consists in the novel features hereinafter described, reference being had to the accompanying drawings, which illustrate one form in which we have contemplated embodying our invention, and said invention is fully disclosed in the following description and claims.

Referring to the drawings, Figure 1 represents a transverse section through the upper part of a machine of the kind described, showing the rotary cutter and connected devices in operative position. Fig. 2 is a similar view showing the hubs of the cutter separated to permit the blades to be changed. Fig. 3 is a top plan view of the cutter and connected mechanism. Fig. 4 is a detail showing the hollow cutter-shaft and air-tube in section and the central shoe. Fig. 5 is an enlarged sectional view of the cutter. Fig. 6 is a front view of one of the hubs. Fig. 7 is a side view of one of the blade-operating cams detached. Fig. 8 represents a modified form of blade.

In the machine described in the application of L. P. Whitaker above referred to the leaves are operated upon by currents of air and also by a rotary cutter, and this invention comprises certain improvements in and connected with the said rotary cutter. It will therefore be unnecessary to describe particularly any more of the machine than is sufficient to make the construction and operation of the rotary cutter clearly intelligible.

In the drawings, A A represent the two longitudinally-extending side frames of the machine mounted on legs and carrying the working parts. B B represent the tobacco-carrying feed-belts, carried by large grooved wheels, (not herein shown,) the inner parallel stretches of the belts being pressed together by two parallel series of rollers $c'$ $c'$. (Indicated in the drawings.) D is the stemming-tube, through which the stemmed leaves are carried by the current of air and discharged, all as clearly shown and described in the former application referred to.

E represents the hollow cutter-shaft, mounted in bearings $e$ $e'$ $e^2$ and provided with a driving-pulley $e^3$. Upon the shaft $e$ are mounted two separate cutter-hubs G G, which can be moved longitudinally of the shaft to bring them nearly together or a considerable distance apart, and the shaft is provided with keys or splines $e^4$ $e^4$ or their equivalents to engage a corresponding keyway in the hubs when the latter are in their innermost positions, so that the hubs will rotate with the shaft. The shaft E is provided between the hubs with a plurality of slots or holes $e^5$, corresponding to the number of blades carried by the hubs, as shown in Fig. 4.

A stationary air-tube F extends through the hollow shaft E and projects beyond the ends of the shaft, being held from rotation by the split collars $f$ $f$, which collars have arms $f'$ $f'$, which are secured by screws to the outer bearings $c$ and $c^2$. The air-tube F is supplied with air by rubber tubes $f^2$ $f^2$ from a suitable source of air under pressure connected to opposite ends of the air-tube F, as fully set forth in the former application before referred to. Only one of these supply-tubes $f^2$ is shown in the drawings, and in some cases only such tube is employed, the other end of air-tube F being in such case closed. We prefer, however, to supply air from both ends of the tube F, as a better control of the air is obtained in this way. The air-tube F is also provided with a single slot or aperture $f^3$, adapted to register with one of the apertures in the shaft on the rear side and direct a current of air down the stemming-tube.

Each of the hubs G is provided with a number of radially-disposed and longitudinally-extending slots, six being shown in each hub, in each of which is a longitudinally-reciprocating blade $g^3$, having a cutting edge $g^4$. Each blade has a narrow shank portion $g^5$ and a nib $g^6$, which works in a cam-groove $h$ in a cam H, fitted to turn within a recess in the back of the hub, as clearly shown in Fig. 7, the cam being shown separately in Fig. 9.

The blades $g^3$ are guided in their movements by an outer ring $g^7$, fitted over the hub and engaging the upper edges of the blades, and by a ring $g^8$, fitted into the inner face of the hub, flush therewith and engaging the bottom faces of the blades. These rings are held by screws and can be turned when desired, (by boring new holes for the retaining-screws,) so as to give new bearing-faces for the blades to work against, or they may be replaced, if necessary, without renewing the hub. The cams H are each provided with a reduced stem $h'$, forming a shoulder $h^2$ at its junction with the cam proper, and each hub is provided with a retaining-ring, secured thereto by screws or otherwise in rear of said shoulder and having an aperture for the stem $h'$, thus retaining the cam within the hub and causing them to move longitudinally of the shaft together. The cams are loose on the shaft and in operative position are held from rotation. In this instance the stem of each cam is shown provided with a ring $h^3$, secured thereto by set-screws and provided with an eye $h^4$, which when the parts are in operative position (see Figs. 1 and 3) is engaged by a stud $i$ on an arm I, secured to some stationary portion of the machine. It will be observed that by means of this ring $h^3$ the cam can be adjusted by loosening the set screw or screws in said ring so as to change the relative positions of the cam and the hubs without disturbing the devices for preventing the rotation of said cams.

Means are also provided for separating the hubs to permit the blades to be removed and replaced for sharpening, &c. In this instance the bearings $e$ and $e'$ are shown provided each with a hand-lever K, pivoted at its lower end on a thumb-screw $k$, provided with a wing-head for convenience, and a link $k'$ extends from said lever to the ring $h^3$ of the adjacent cam, by which means the cams and hubs can be moved to their inner or outer positions and secured in their inner positions by means of said wing-screws $k'$. The bearings referred to are also provided each with a set-screw $k^2$, which is located so as to engage the lever K when it is pushed in and regulate the operative positions of the hubs and blades with respect to each other. This set-screw is preferably provided with the usual lock or jam nut or other device to prevent it from turning.

It will be noticed that the blades do not extend inwardly to the shaft, and we therefore provide a shoe L, (see Figs. 2, 4, and 5,) which engages the shaft and nearly encircles the same and is of such thickness that the blades just pass over it without touching it. The shoe is open at the rear, where the current of air is discharged from the inner or air tube, as shown in Fig. 6, and the shoe is further provided with an arm $l$, which is secured to the stemming-tube or other fixed portion of the frame to prevent the shoe from rotating.

In operative position the hubs are pushed inwardly, as shown in Figs. 1, 3, and 5, so that the blades of the opposite hubs are opposite each other and have their cutting edges closely adjacent, forming a notch into which the stems of the leaves are drawn by the feed-belts. The blades operate on opposite sides of the stem, assisting the air-currents in severing the lateral fibers of the leaves and removing the lateral leaf portions from the stems. The grooves $h$ in the cams H are so arranged and the cams so adjusted that as soon as the blades have moved from the top of the knife forward a desired distance the cam grooves will cause the blades to move back into the hubs and remain in until they reach a point adjacent to the top of the cutter, when they are again projected into working position. It will be seen, therefore, that only a portion of the blades are in operative position at a time, the others being retracted within the hubs, and the position of the working blades with respect to the hubs can be adjusted by adjusting the cams forward or back in a direction around the shaft within the rings $h^3$ $h^3$, as before described.

By means of this construction each pair of blades are brought toward each other into operative position on the upper side of the shaft. As the leaves of tobacco are drawn over the knife their stems enter the recess between each pair of blades and the blades cut the lateral fibers of the leaves and assist in separating the leaf portions, pushing them to the front. As soon as the blades begin to turn downward beyond the predetermined point they are quickly retracted by the cams, so as to withdraw them from contact with the severed leaf portions. This avoids tearing the severed leaf portions and permits them to pass under the shaft, while the stem passes over the top, and as the blades are retracted all the way around the under part of the shaft the severed leaf portions will not be caught and wrapped around the cutter, as might happen if stationary blades were used. The leaf portions as they pass around beneath the shaft are exposed to the air-blast and are carried off through the channel provided for their delivery. As the stems are fed and carried through the machine at an angle to the feeding-belts, the adjustment of the cams around the shaft which determines the point at which the blades come into operative position and the point at which they separate, thus at the same time practically controls the duration of the period that each blade acts upon the stem during a revolution. Thus if the cams are turned backward, so that the blades close in rear of a vertical position and open substantially at vertical position, the duration of the period of action of the blades on the stem would be very short, while this duration may be increased by adjusting the cams forwardly around the shaft.

In Fig. 8 we have shown a modified form of blade which is made in two parts G G², the one carrying the cutting edge and the other carrying the nib, and a spring G³ is interposed between the two parts. The object of this construction is to enable the cutting edges to yield slightly to accommodate large stems, as the cutting edges are not intended to operate on the stems themselves, but only to assist in severing the lateral fibers and leaf portions therefrom.

What we claim, and desire to secure by Letters Patent, is—

1. A rotary cutter for tobacco-stemming machines, comprising a shaft, a series of pairs of blades arranged around said shaft, and extending substantially radially therefrom, the blades of each pair being movable longitudinally of the shaft away from and toward each other, and mechanism for reciprocating said blades, substantially as described.

2. A rotary cutter for tobacco-stemming machines comprising a shaft, a series of pairs of blades arranged around said shaft, and extending substantially radially therefrom, the blades of each pair being movable longitudinally of the shaft away from and toward each other, each of said blades having a cam-engaging portion, and cams on said shaft engaging the cam-engaging portions of said blades for reciprocating the same, said cams and said blades being movable with respect to each other, substantially as described.

3. A rotary cutter for tobacco-stemming machines comprising a shaft, a series of pairs of blades arranged around said shaft, and extending substantially radially therefrom, the blades of each pair being movable longitudinally of the shaft away from and toward each other, each of said blades having a cam-engaging portion, cams on said shaft engaging said blades, means for rotating said shaft, and means for holding said cams stationary, substantially as described.

4. A rotary cutter for tobacco-stemming machines comprising a shaft, a series of pairs of blades arranged around said shaft, and extending substantially radially therefrom, the blades of each pair being movable longitudinally of the shaft away from and toward each other, each of said blades having a cam-engaging portion, cams on said shaft engaging said blades, means for rotating said shaft, means for holding said cams stationary, and means for adjusting said cams in a direction around the shaft, substantially as described.

5. A rotary cutter for a tobacco-stemming machine, comprising a rotary shaft, two opposite hubs mounted thereon, and rotating therewith, longitudinally-movable blades mounted in said hubs, and a cam for each hub for reciprocating said blades, and retracting them entirely within the hubs, during a portion of their rotary movement, substantially as described.

6. A rotary cutter for a tobacco-stemming machine comprising a shaft, hubs thereon, movable blades fitted in said hubs, cams for operating said blades, and means for adjusting said hubs and cams at different distances apart to vary the distance between the cutting edges of opposing blades, substantially as described.

7. A rotary cutter for a tobacco-stemming machine comprising a shaft, hubs thereon, movable blades fitted in said hubs, cams for operating said blades and mechanism for moving said hubs and cams apart, longitudinally of the shaft to permit the removal and insertion of the blades, substantially as described.

8. A rotary cutter for a tobacco-stemming machine comprising a shaft, hubs thereon, movable blades mounted in said hubs, cams for operating said blades, devices for moving said hubs and cams longitudinally of said shaft, and adjustable stops for engaging said devices and limiting the movement of said hubs inwardly toward each other, substantially as described.

9. A rotary cutter for a tobacco-stemming machine, comprising a shaft, hubs thereon, movable blades fitted to slide in said hubs, cams for operating said blades, levers operatively connected with said cams and hubs for moving them longitudinally of said shaft, adjustable stops located in position to engage said levers, and devices for locking said levers rigidly in position, substantially as described.

10. A rotary cutter for tobacco-stemming machines comprising a shaft, a pair of opposing hubs mounted on said shaft and rotatable therewith, a series of blades mounted in each hub and adapted to reciprocate longitudinally of the shaft, cams on said shaft engaging portions of said blades for reciprocating them, means for adjusting said cams in a direction around the shaft and holding them stationary in their adjusted positions, substantially as described.

11. A rotary cutter for tobacco-stemming machines comprising a shaft, hubs mounted thereon, blades mounted in said hubs, and arranged concentrically to but at a distance from said shaft, and a stationary shoe encircling a portion of said shaft, and lying between the shaft and the inner edges of said blades, substantially as described.

12. A rotary cutter for a tobacco-stemming machine comprising a shaft, hubs thereon, movable blades fitted in said hubs, cams for operating said blades and a stationary shoe engaging said shaft, between said hubs, said blades being arranged to pass outside of said shoe, substantially as described.

13. A rotary cutter for tobacco-stemming machines comprising a rotary shaft, a pair of hubs adapted to rotate therewith, a plurality of yielding blades carried by each hub and cams for operating said blades, substantially as described.

14. A rotary cutter for tobacco-stemming machines, comprising a rotary shaft, a pair of hubs adapted to rotate therewith, a cam on said shaft adjacent to each of said hubs, a plurality of yielding blades each formed of two parts having a spring between said parts, one of said parts being provided with a cutting edge and the other part with a portion to engage one of said cams, substantially as described.

15. A rotary cutter for tobacco-stemming machines, comprising a pair of hubs, opposing blades carried thereby, each blade being provided with a portion having a cutting edge, and constructed to yield in a direction away from its opposing blade, substantially as described.

16. A rotary cutter for tobacco-stemming machines, comprising a hollow shaft provided with a plurality of air-discharging apertures, a circular series of blades arranged on said shaft on each side of said apertures, said blades being arranged in opposing pairs, and being movable longitudinally of the shaft, stationary cams on said shaft for reciprocating said blades, and means for supplying air to said air-discharging apertures, substantially as described.

17. A rotary cutter for tobacco-stemming machines, comprising a hollow shaft provided with a plurality of air-discharging apertures, a circular series of blades arranged on said shaft on each side of said apertures said blades being arranged in opposing pairs, and being movable longitudinally of the shaft, stationary cams on said shaft for reciprocating said blades, and an air-supply tube extending into said hollow shaft and having a single discharge-aperture adapted to register successively with the apertures in said shaft, substantially as described.

18. A rotary cutter for tobacco-stemming machines comprising a hollow shaft provided with a plurality of air-discharging apertures, a circular series of blades arranged on said shaft on each side of said apertures said blades being arranged in opposing pairs, and being movable longitudinally of the shaft, stationary cams on said shaft for reciprocating said blades, a stationary shoe mounted on said shaft between it and the inner edges of said blades and having a portion cut away, and an air-tube extending into said hollow shaft, and provided with a discharge-aperture in line with the cut-away portion of the shoe, said aperture being arranged to register successively with the apertures in said shaft, substantially as described.

In testimony whereof we affix our signatures in the presence of two witnesses.

J. H. WHITAKER.
LOUIS P. WHITAKER.

Witnesses:
J. K. MOORE,
GEORGE M. BOND.